United States Patent
Zhang et al.

(10) Patent No.: US 10,942,923 B1
(45) Date of Patent: Mar. 9, 2021

(54) DEEP LEARNING FOR OPTIMIZER CARDINALITY ESTIMATION

(71) Applicant: Teradata US, Inc, Dayton, OH (US)

(72) Inventors: Yinuo Zhang, Los Angeles, CA (US); Sung Jin Kim, Buena Park, CA (US); Grace Kwan-On Au, Rancho Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 172 days.

(21) Appl. No.: 16/220,845

(22) Filed: Dec. 14, 2018

(51) Int. Cl.
*G06F 16/00* (2019.01)
*G06F 16/2453* (2019.01)
*G06N 3/04* (2006.01)
*G06K 9/62* (2006.01)
*G06N 3/08* (2006.01)

(52) U.S. Cl.
CPC ..... *G06F 16/24545* (2019.01); *G06K 9/6256* (2013.01); *G06N 3/0472* (2013.01); *G06N 3/08* (2013.01)

(58) Field of Classification Search
CPC ........... G06F 16/24545; G06F 16/2255; G06F 16/24542; G06F 16/2365; G06F 16/00; G06F 17/30607; G06F 17/30557; G06F 17/30; G06F 16/951; G06F 17/18; G06F 17/277; G06F 17/30864; G06F 40/284; G06F 40/258; G06F 40/44; G06F 16/9537; G06F 16/9535; G06F 16/285; G06F 16/24578; G06Q 40/02; G06Q 10/04; Y10S 707/99934; G06K 9/6256; G06K 9/6267; G06N 3/08; G06N 3/0472; G06N 3/06
See application file for complete search history.

(56) References Cited

U.S. PATENT DOCUMENTS

| | | | | |
|---|---|---|---|---|
| 6,108,648 A | * | 8/2000 | Lakshmi | G06F 16/24545 |
| 10,318,866 B2 | * | 6/2019 | Corvinelli | G06N 3/0472 |

(Continued)

OTHER PUBLICATIONS

Ortiz, Jennifer; Balazinska, Magdalena; Gehrke, Johannes; Keerthi, S. Sathiya; "Learning State Representations for Query Optimization with Deep Reinforcement Learning," DEEM'18: International Workshop on Data Management for End-to-End Machine Learning, Jun. 15, 2018, Houston, TX, USA. ACM, New York, NY, USA.

(Continued)

*Primary Examiner* — Anh Ly
(74) *Attorney, Agent, or Firm* — Howard Speight

(57) ABSTRACT

A database query to be run against a database is received by a processor. The query includes a query predicate. The query predicate includes a condition. The condition applies to a single database table. The condition is parsed to create an input vector. The input vector is submitted to a neural network. The neural network is trained to calculate the selectivity, a number of unique values (NUV) of results of applying predicates to the single database table, and a high mode frequency (HMF) of results of applying predicates to the single database table. The neural network determines the selectivity of the query predicate, an NUV for each column in the result of applying the query predicate to the single database table, and an HMF for each column in the result of applying the query predicate to the single database table.

13 Claims, 8 Drawing Sheets

(56) References Cited

U.S. PATENT DOCUMENTS

| | | | | |
|---|---|---|---|---|
| 10,545,932 | B2* | 1/2020 | Tang | G06F 16/217 |
| 10,558,633 | B1* | 2/2020 | Kim | G06F 16/2255 |
| 10,706,354 | B2* | 7/2020 | Corvinelli | G06N 3/04 |
| 2003/0078923 | A1* | 4/2003 | Voss | G06F 16/284 |
| 2007/0288421 | A1* | 12/2007 | Chakrabarti | G06F 16/903 |
| 2011/0022581 | A1* | 1/2011 | Korlapati | G06F 16/24542 |
| | | | | 707/713 |
| 2011/0029507 | A1* | 2/2011 | Au | G06F 16/2456 |
| | | | | 707/714 |
| 2016/0260011 | A1* | 9/2016 | Corvinelli | G06N 3/0472 |
| 2017/0323200 | A1* | 11/2017 | Corvinelli | G06F 16/24545 |

OTHER PUBLICATIONS

Boulos, Jihad, Viemont, Yann, Ono, Kinji, A Neural Networks Approach for Query Cost Evaluation, pp. 1-16, National Center for Science Information Systems, Tokyo, Japan, Laboratoire PRiSM, Univ. de Versailles-St-Quentin, Versailles Cedex, France.

Lakshmi, Seetha, Zhou, Shaoyu, Selectivity Estimation in Extensible Databases—A Neural Network Approach, pp. 623-627, Informix Software Inc., Menlo Park, CA 94025.

Lu, Hongjun, Setiono, Rudy, Effective Query Size Estimation Using Neural Networks, pp. 1-20, School of Computing, National University of Singapore, Kent Ridge, Singapore 119260.

* cited by examiner

DEEP LEARNING FOR OPTIMIZER CARDINALITY ESTIMATION

BACKGROUND

Estimates of cardinality for a query predicate on a table may be used by cost-based query optimizers to identify optimal execution plans. The accuracy of the cardinality estimate may affect the quality of the execution plan. Cardinality estimation is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
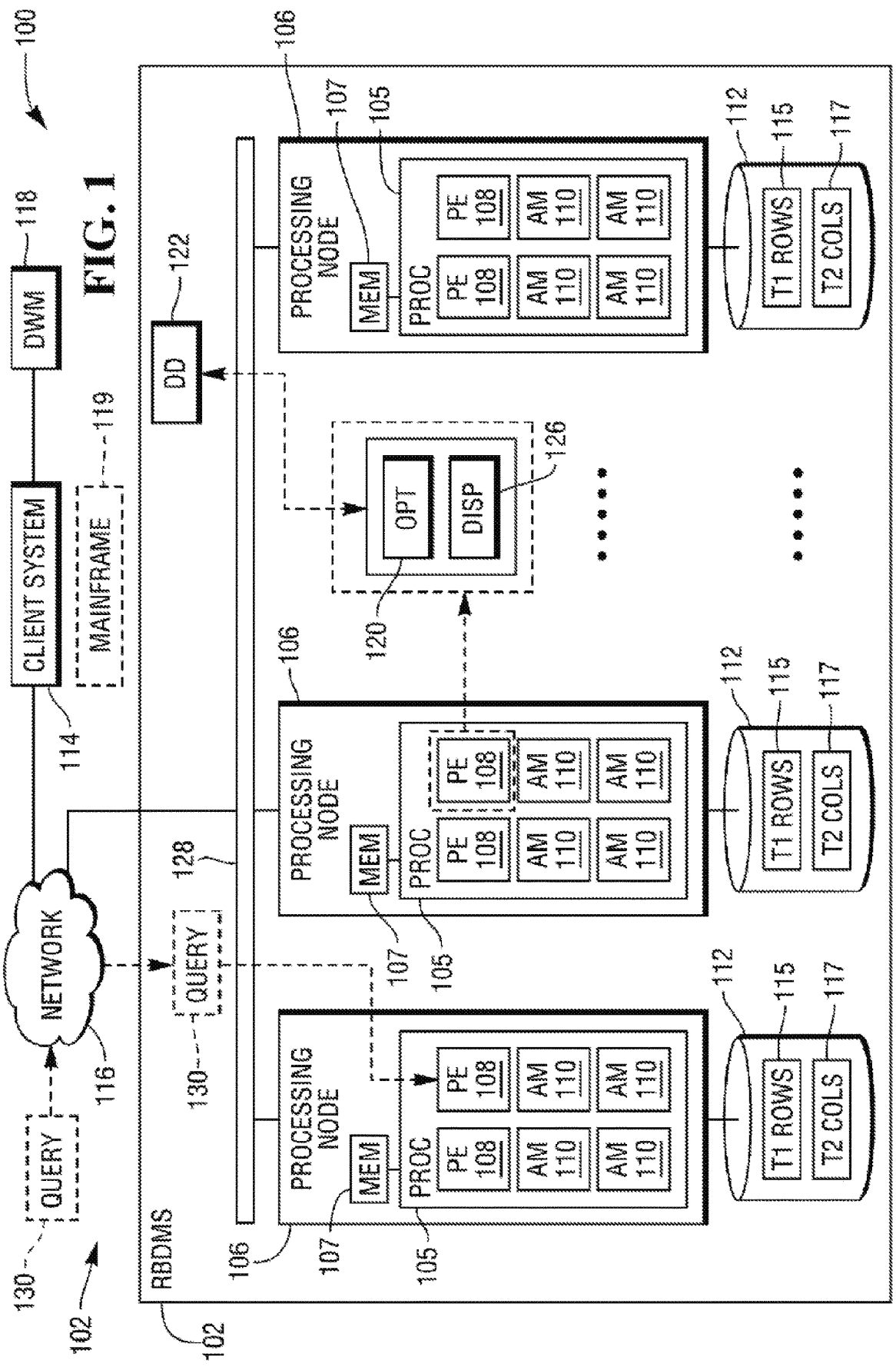
FIG. 1 is a block diagram of an example distributed relational database system.

FIG. 1 is a diagrammatic representation of an example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

Figure 2:
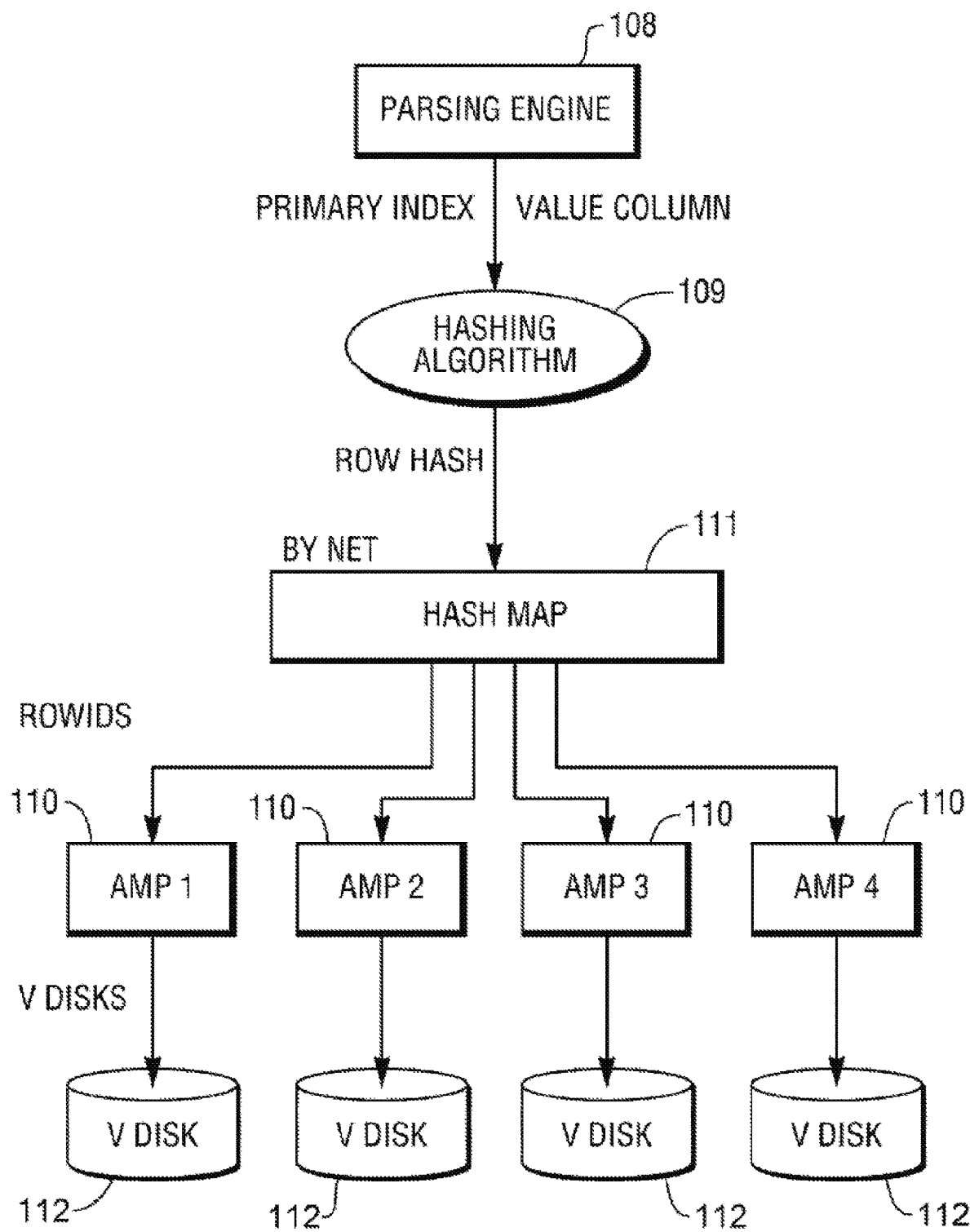
FIG. 2 illustrates a hashing process for distributing records in a table across database modules.

The RBDMS 102 stores data in one or more tables in the DSFs 112. In one example, the database system 100 may be configured to distribute rows across access modules 110 and their associated DSFs 112 in accordance with their primary index. The primary index distributes the records in a table across the AMPs, by hashing the columns that make up the primary index to determine which records go to which AMP. FIG. 2 provides an illustration of this hashing process. A hashing algorithm 109 produces hash values from the values in the columns specified by the primary index. Some portion, possibly the entirety, of the hash value is designated a "hash bucket." The hash buckets are assigned to DSFs 112 and associated access modules 110 by a hash bucket map 111. The characteristics of the columns chosen for the primary index determine how evenly the rows are distributed.

For an access module 110, rows of each stored table may be stored across multiple DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 3 and 4. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 302 (see FIG. 3), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 3:
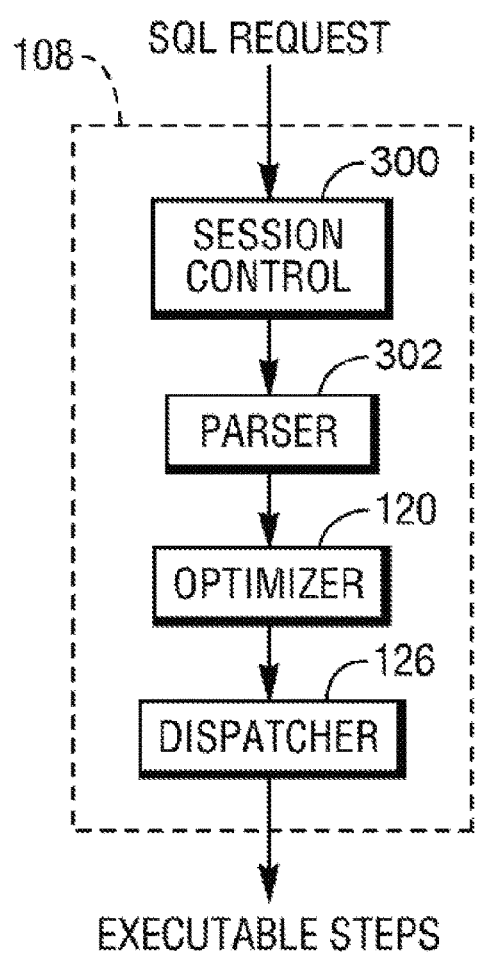
FIG. 3 is a block diagram of a portion of the example database system of FIG. 1.

In one example system, each parsing engine module 108 includes four primary components: a session control module 300, a parser module 302, the optimizer module 120, and a dispatcher module 126 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

Figure 4:
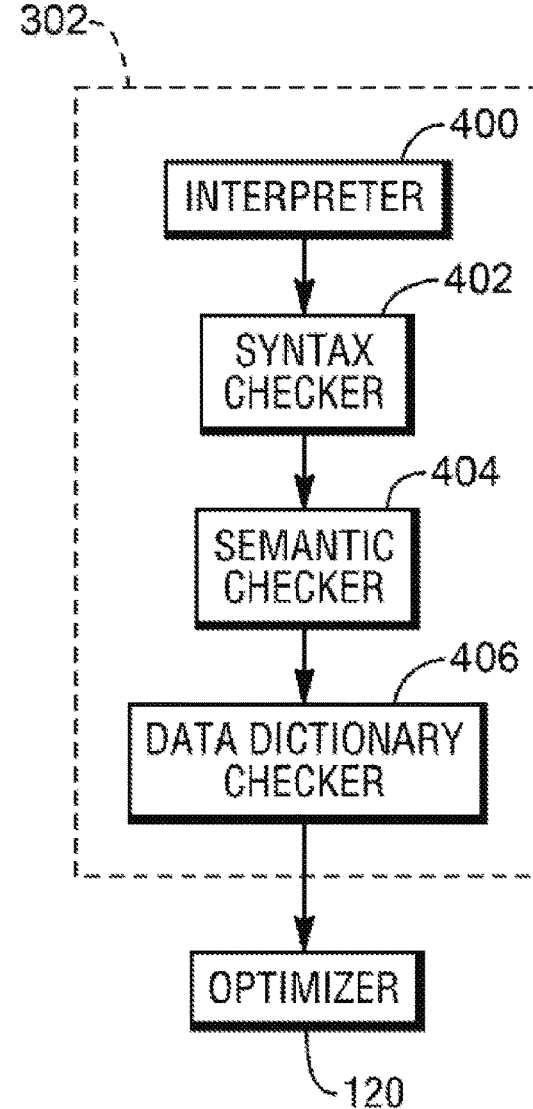
FIG. 4 is a block diagram of another portion of the example database system of FIG. 1.

As illustrated in FIG. 4, the parser module 302 may include an interpreter module 400 that interprets the SQL request. The parser module 302 may also include a syntax checker module 402 that checks the request for correct SQL syntax, as well as a semantic checker module 304 that evaluates the request semantically. The parser module 302 may additionally include a data dictionary checker 406 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

This disclosure describes a technique for improving the accuracy of cardinality estimation used by the optimizer 120 in identifying an optimal execution plan. The technique uses a neural network that is specific to a single database table to estimate the cardinality of a predicate on the single database table.

A "predicate" is defined for the purposes of this disclosure to be single condition or a combination of multiple "conditions" that refer to the single database table. A "condition" is defined to be a value or range of values for a column in the single database table. For example, in a SELECT query such as "SELECT*FROM Orders WHERE Quantity=10 and OrderNo>5", the predicate is "Quantity=10 and OrderNo>5" which consists of two conditions: "Quantity=10" and "OrderNo>5".

Figure 5:
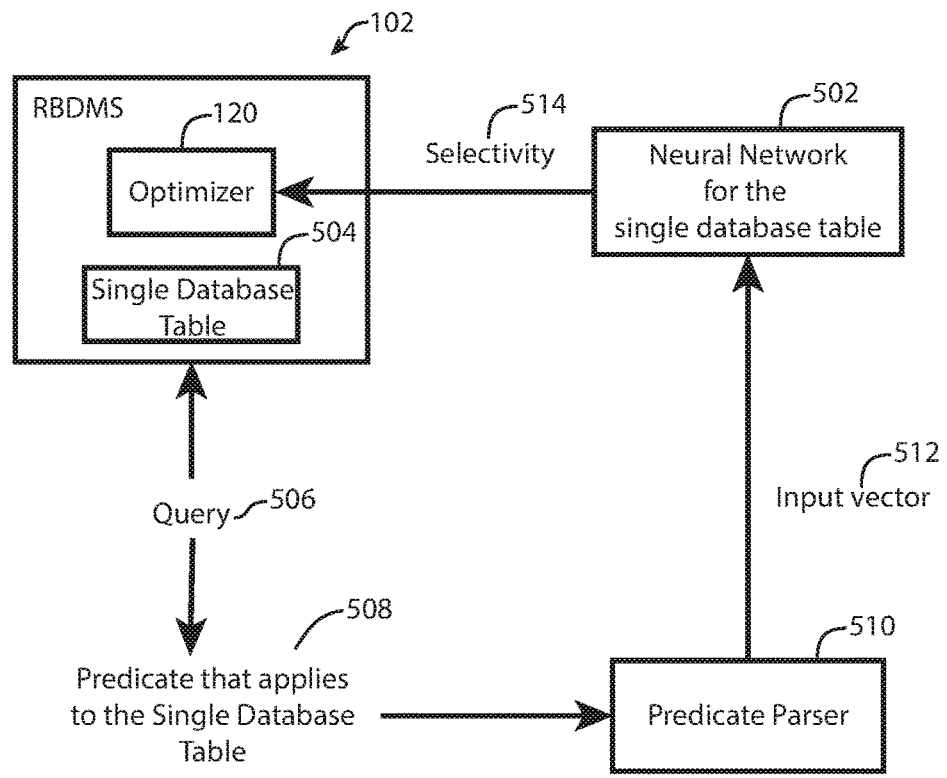
FIG. 5 is a block diagram of a selectivity estimator using a neural network.

In one or more embodiments, as illustrated in FIG. 5, a neural network 502 is built for a single database table 504.

The neural network 502 of the single database table 504 is used to estimate the selectivity of a predicate with any column (or combinations of columns) of the table. Columns of interest, referred to herein as "target columns," can be restricted by users. If users know that a certain set of columns are not used in their workload, they could exclude those columns in consideration. The number of target columns is denoted as "C."

In one or more embodiments, a query 506 is analyzed to extract a predicate 508 that applies to the single database table 504. The predicate 508 is then processed by a predicate parser 510 to produce an input vector 512. The input vector 512 is submitted to the neural network 502, which produces a selectivity estimate 514. The selectivity estimate 514 is submitted to the optimizer 120 to be used in planning execution of the query 506.

Figure 6:
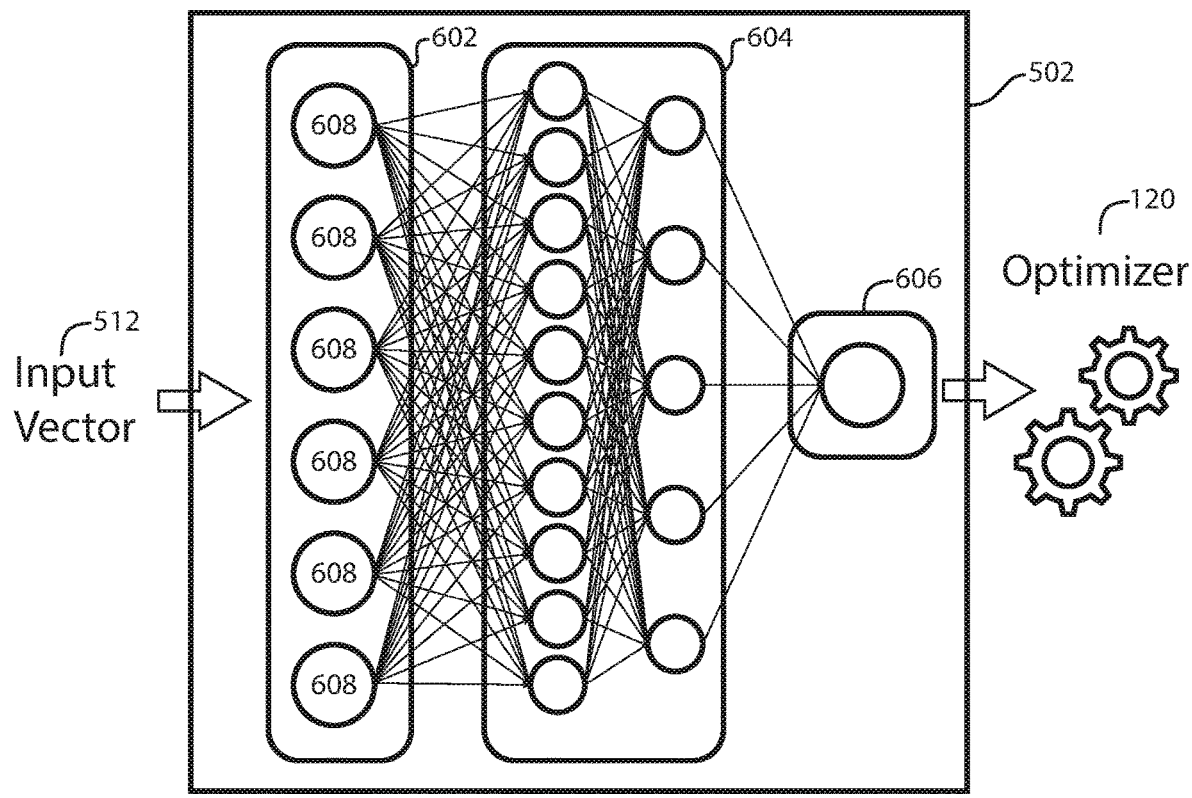
FIG. 6 is a block diagram of a neural network.

FIG. 6 shows a neural network 502. In one or more embodiments, the neural network includes an input layer 602, hidden layers 604, and an output layer 606.

The input layer 602 is designed to receive the information of a predicate, generated by the predicate parser 510 from the predicate 508 extracted from the query 506. As mentioned above, the predicate consists of a condition or set of conditions, where each condition is a value or range of values, such as a lower bound value and an upper bound value of a column. The input vector 512 is a representation of the predicate 508.

For example, suppose that interest is in three target columns of an Orders table: OrderNo, Quantity, and Price. For the rows whose OrderNo is between 100 and 200, Quantity is 10, and Price is between 1000 and 2000, the input vector 512 may be formed as follows:

(100, 200, 10, 10, 1000, 2000)

The input vector 512 can be generalized. One neuron 608 in the input layer 602 receives a respective one value from the input vector. So, if there are C number of target columns, then the input layer has "2*C" neurons, as shown below:

$(s_1, e_1, s_2, e_2, \ldots s_C, e_C)$ where:
$s_1$ is the lower bound of the target column 1,
$e_1$ is the upper bound of the target column 1,
$s_2$ is the lower bound of the target column 2,
$e_2$ is the upper bound of the target column 2,
. . .
$s_C$ is the lower bound of the target column C, and
$e_C$ is the upper bound of the target column C.

The hidden layers 604 can include any number of layers and neurons, as chosen by the user.

The output layer 606 includes a single neuron. The output of the output layer is the selectivity 514, denoted as O, for the predicate 508 corresponding to the input vector 508 extracted from the query 506.

Figure 7:
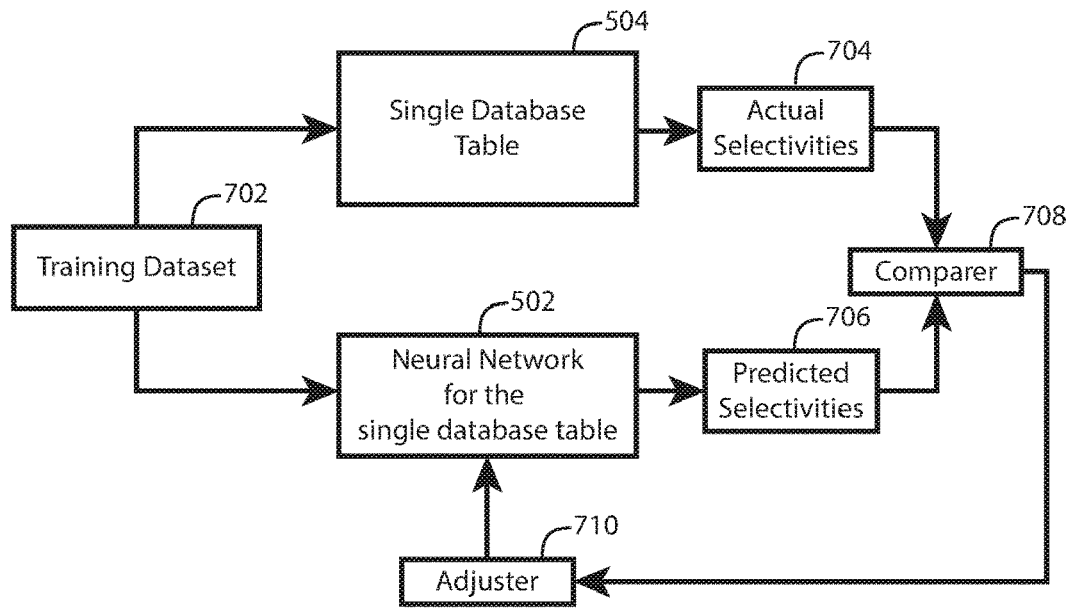
FIG. 7 is a block diagram illustrating training of a neural network.

The neural network is trained through the use of a training dataset 702, as illustrated in FIG. 7. The training dataset 702 consists of a plurality of input vectors and corresponding "actual selectivities" 704, which are the selectivities produced by applying the input vectors in the training dataset 702 to the single database table 504. The input vectors in the training dataset 702 can be derived from past workloads and/or can be generated in a random fashion. The actual selectivities 704 can be obtained from the past workload execution log or through execution of queries corresponding to the input vectors in the training dataset 702. Randomly-generated input vectors may be converted to queries (using the converse of the process for creating input vectors from predicates) which are then executed by the database system 100 to determine respective actual selectivities. The size of the training dataset 702 is determined by a time constraint within which one session of training (i.e., a so-called "epoch") can be accomplished.

The input vectors in the training dataset 702 are also run through the neural network 502 to produce predicted selectivities 706. The actual selectivities 704 are compared to the predicted selectivities 706 by a comparer 708 and the differences are submitted to an adjuster 710 that adjusts the neural network 502 to reduce the differences.

Figure 8:
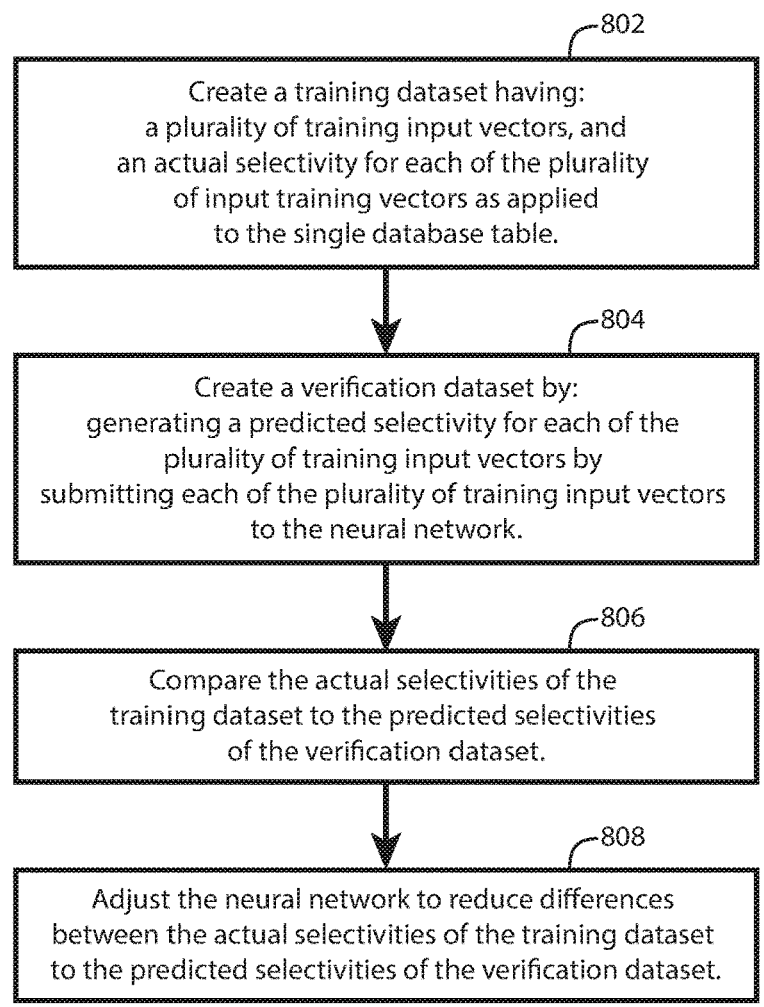
FIG. 8 is a flow chart illustrating training of a neural network.

Thus, as illustrated in FIG. 8, the neural network is trained by creating a training dataset 702 having a plurality of training input vectors and an actual selectivity 704 for each of the plurality of training input vectors as applied to the single database table (block 802). A verification dataset 706 is created by generating a predicted selectivity for each of the plurality of training input vectors by submitting each of the plurality of training input vectors to the neural network (block 804). The actual selectivities of the training dataset 704 are compared to the predicted selectivities of the verification dataset 806 (e.g., by comparer 708) (block 806). The neural network is adjusted to reduce differences between the actual selectivities of the training dataset to the predicted selectivities of the verification dataset (block 808)(e.g., by adjuster 710).

The following is an evaluation metric example. In the following discussion, it is understood that "cardinality" is computed from "selectivity," i.e., the cardinality of a result is the selectivity of the result multiplied by the number of rows in the single database table 504. A neural network is ε—quality if $|MSE_t - MSE_{t-1}| < \varepsilon$, where $MSE_t$ is the Mean Squared Error of the cardinality estimation on the training dataset 702 using the current neural network 502, and $MSE_{t-1}$ is the Mean Squared Error of cardinality estimation on the training dataset using the neural network 502 trained one epoch ago. $MSE = 1/n \Sigma_{i=1}^{n}(O_i - \hat{O}_i)^2$, where n is the number of verification vectors in the evaluation set, $O_i$ is the actual cardinality of $i^{th}$ verification vector and $\hat{O}_i$ is the estimated cardinality of $i^{th}$ verification vector using the neural network.

Training and evaluating the neural network are repeated until the quality is accepted. Users can limit the number of repetitions to avoid infinite time and resource consumption for the training. Training is determined to be a failure if the number of repetitions reaches the limit but the quality does not meet the criteria. For cardinality estimations over a table with no qualified neural network, the traditional estimation approach is used.

Figure 9:
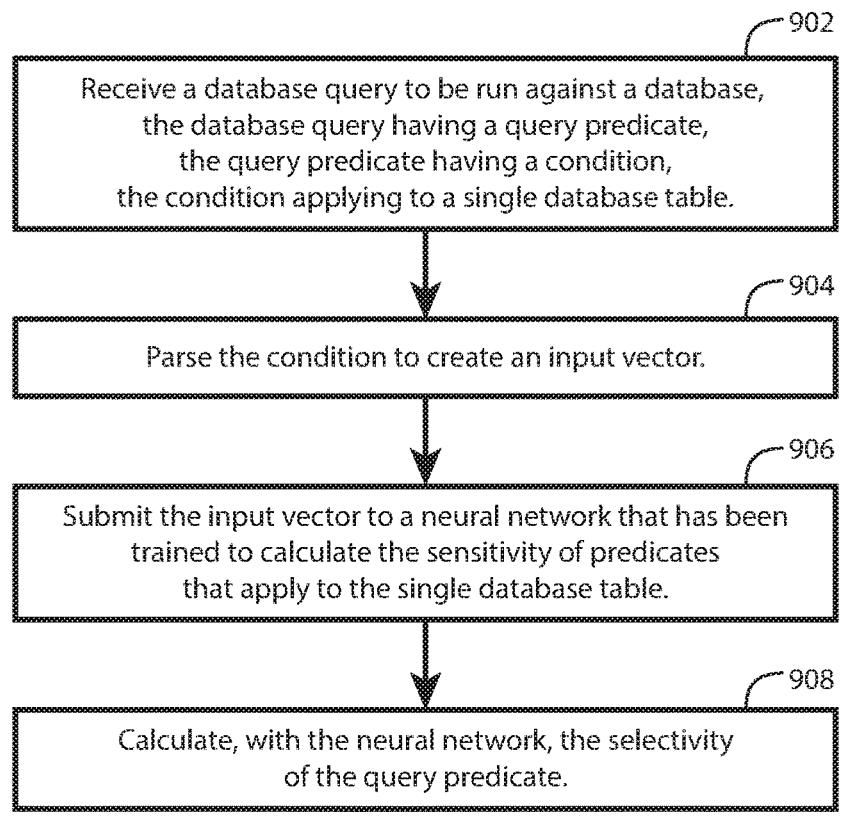
FIG. 9 is a flow chart illustrating estimation of selectivity using a neural network.

The estimation of a selectivity for a given predicate, illustrated in FIG. 9, includes receiving, with a processor, such as the RDBMS 102 or one of the processors 105, a database query to be run against a database, where the query has a query predicate, the query predicate has a condition, and the s applies to a single database table (block 902).

The condition is parsed to create an input vector (block 904). If the predicate does not include all columns used in training, the lower bound and the upper bound of the missing column are set to the entire domain of the column. Further, if the query predicate does not restrict one of the lower bound or the upper bound of a column, the unrestricted lower bound or the unrestricted upper bound in the input vector is set to a minimum value or a maximum value, respectively, of the column The input vector is then submitted to the neural network, where the neural network has been trained, as described above, to calculate the selectivity of predicates that apply to the single database table (block 906).

The neural network calculates the selectivity of the query predicate (block 908). The cardinality is computed by multiplying the selectivity by the total number of rows in the target relation. For example, if the neural network returns a selectivity of 0.76 and the rowcount of the Order table is 1000, the estimated cardinality is 1000*0.76=760 rows.

The technique described herein was prototyped and tested with a synthetic dataset. Training queries, verification queries and testing queries were randomly generated (i.e., predicates with random ranges within the value domain).

Figure 10:
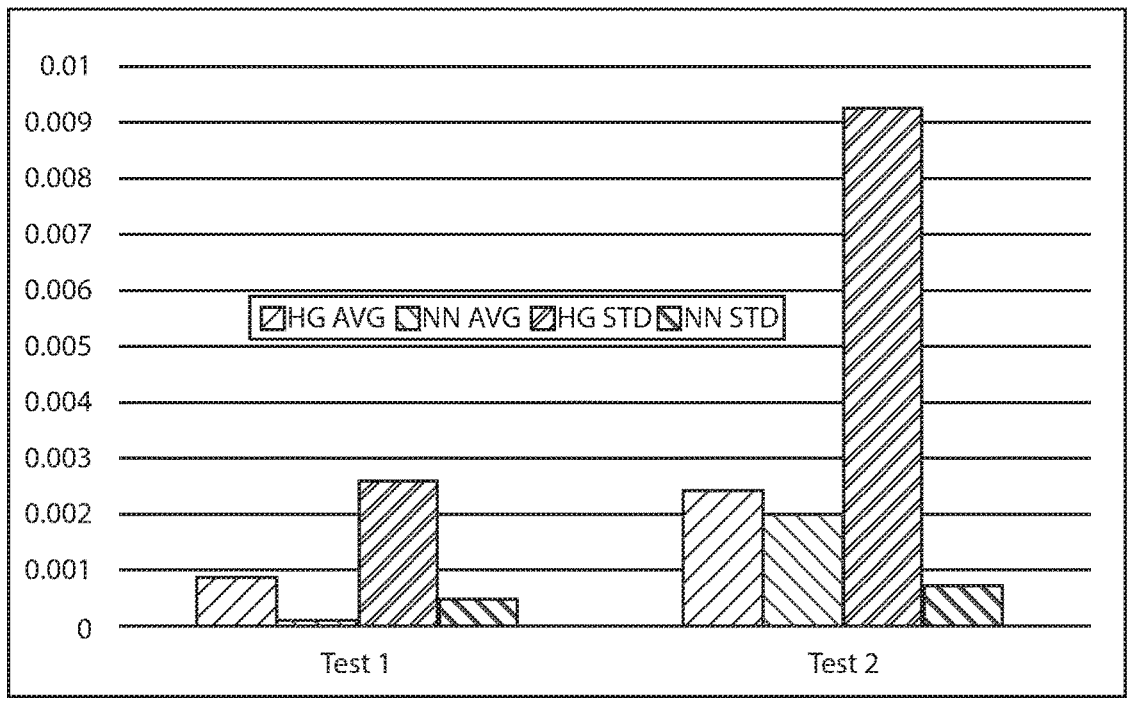
FIG. 10 is a bar chart illustrating a comparison between histogram-based selectivity analysis and neural network-based selectivity analysis.

Two tests were conducted with the synthetic dataset. The first test was done on the data with skewed values. Both skewed and non-skewed values follow uniform distributions. The second test involved data with a Gaussian distribution and functional dependencies. Both average MSE (AVG) and standard deviation of MSE (STD) of the estimated cardinality were measured. As shown in FIG. 10, the Neural Network-based estimation (NN) outperformed the histogram-based approach (HG) in terms of smaller average MSE and smaller standard deviation of MSE in both tests. Average MSE of HG is 3 times greater than that of NN in test 1. To illustrate the result, assume the real cardinality is 1000. The method of using HG gives an estimate of 830, while the method of using NN gives an estimate of 900. In test 2, the standard deviation of MSE is 0.00924 for the method of using HG. This means that the estimated cardinalities which are less than 900 or larger than 1100 occupy half of the estimates. However, for NN-based approach, half of the estimates are between 975 and 1025.

Thus, the technique described herein may produce more accurate results that the histogram-based approach. This may be because the "summary information" of a histogram interval would not represent the actual frequencies of individual values in the interval. Adjacent values with different frequencies may have to be grouped into the same interval. The frequencies of individual values are averaged out. Further, for a predicate with multiple conditions on different columns, a histogram may be built on the combined values of those columns. That is, a histogram may be implemented as a one-dimensional list of histogram intervals. When datasets of two columns are correlated each other, a histogram built for the two datasets may not fully represent how data values in the two datasets are "correlated". A cardinality estimate using the histogram-based approach tends to be inaccurate when a predicate has conditions on correlated columns.

A system, such as the RDBMS 102, may include a plurality of predicate parsers and neural networks, such as predicate parser 510 and neural network 502, to hand predicates directed to a plurality of database tables.

Figure 11:
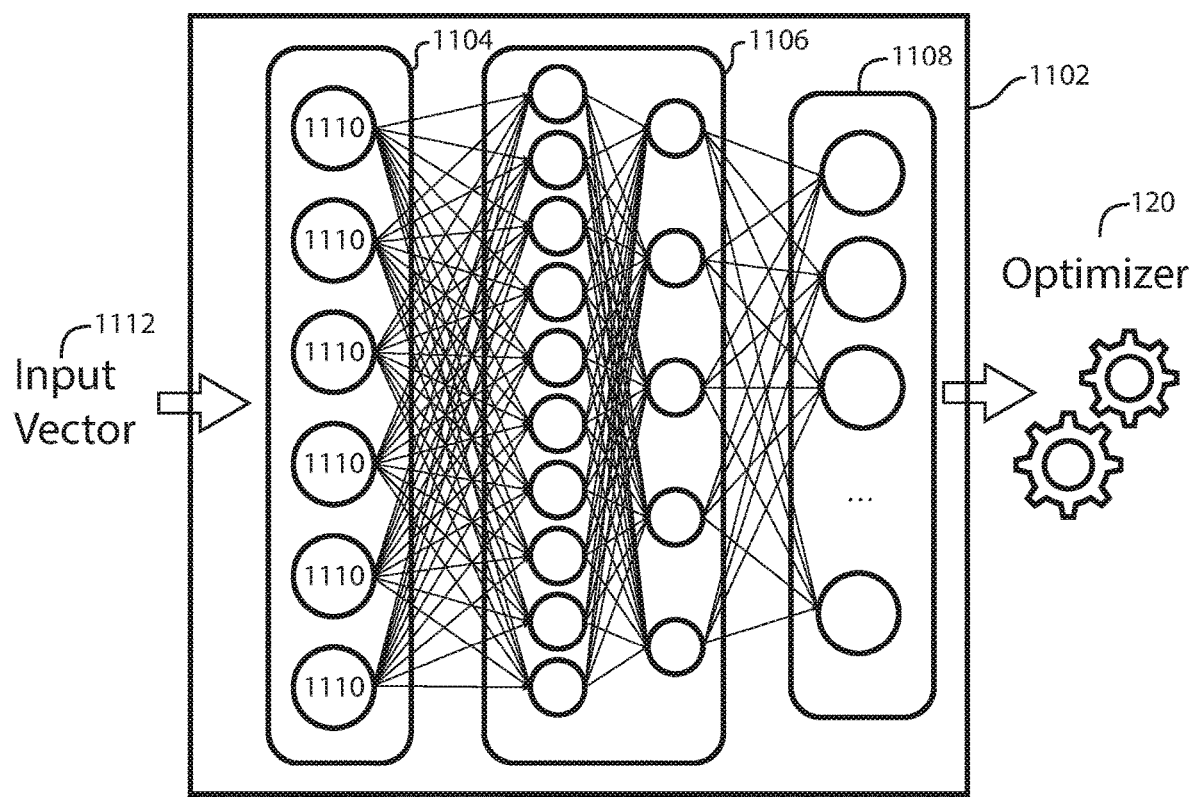
FIG. 11 is a block diagram of an alternative neural network.

FIG. 11 is a block diagram of an alternative neural network. The neural network 1102 of FIG. 11, like the neural network 502 illustrated in FIG. 6, has an input layer 1104, one or more hidden layers 1106, and an output layer 1108. Unlike the neural network 502, the input layer 1104 in the neural network 1102 has 4n neurons (1110), where n is the number of columns in the table. In addition to the lower and upper bounds for each column extracted from the predicate, there are neurons for the lower and upper limits of the column domain. The input vector 1112 has corresponding entries. The output layer 1108, rather than being a single neuron for selectivity as in the neural network 502, includes 2n+1 neurons which include estimates of selectivity, the number of unique values (NUV), and the high mode frequency (HMF) for each column with the predicate applied. To illustrate NUV and HMF, given a dataset (10, 10, 20, 20, 20, 20, 30, 30, 40, 40), NUV=4 (i.e., 4 unique values) and HMF=4 (i.e., the most frequent value is 20, which appears 4 times). The optimizer 120 makes use of the information in the output layer in selecting a join plan.

Like selectivity, the NUV and HMF statistics may be useful for a cost-based optimizer, such as optimizer 120, especially in a database system such as that illustrated in FIG. 1. Consider an aggregation query as an example. If NUV for a grouping column is low, the optimizer 120 may choose to perform a local aggregation step on each AMP 110 to reduce the number of values to be redistributed. The pre-aggregated values are hash-redistributed to AMPs 110 to collocate the same values on the same AMP 110. Then a global aggregation step is performed to compute the final aggregation. If NUV is high, the optimizer 120 may avoid local aggregation with the heuristic that it does not reduce the number of values that need to be redistributed. HMF may used jointly with NUV. For instance, a high HMF of a grouping column indicates that values are skewed. Therefore, the optimizer 120 may favor local aggregation. Otherwise, skew is likely to cause one of the AMPs 110 to become overloaded and the system to be unbalanced.

The system of FIG. 7 may include comparers and adjusters for NUV and comparers and adjusters for HMF that are used to adjust the neural network 502.

Figure 12:
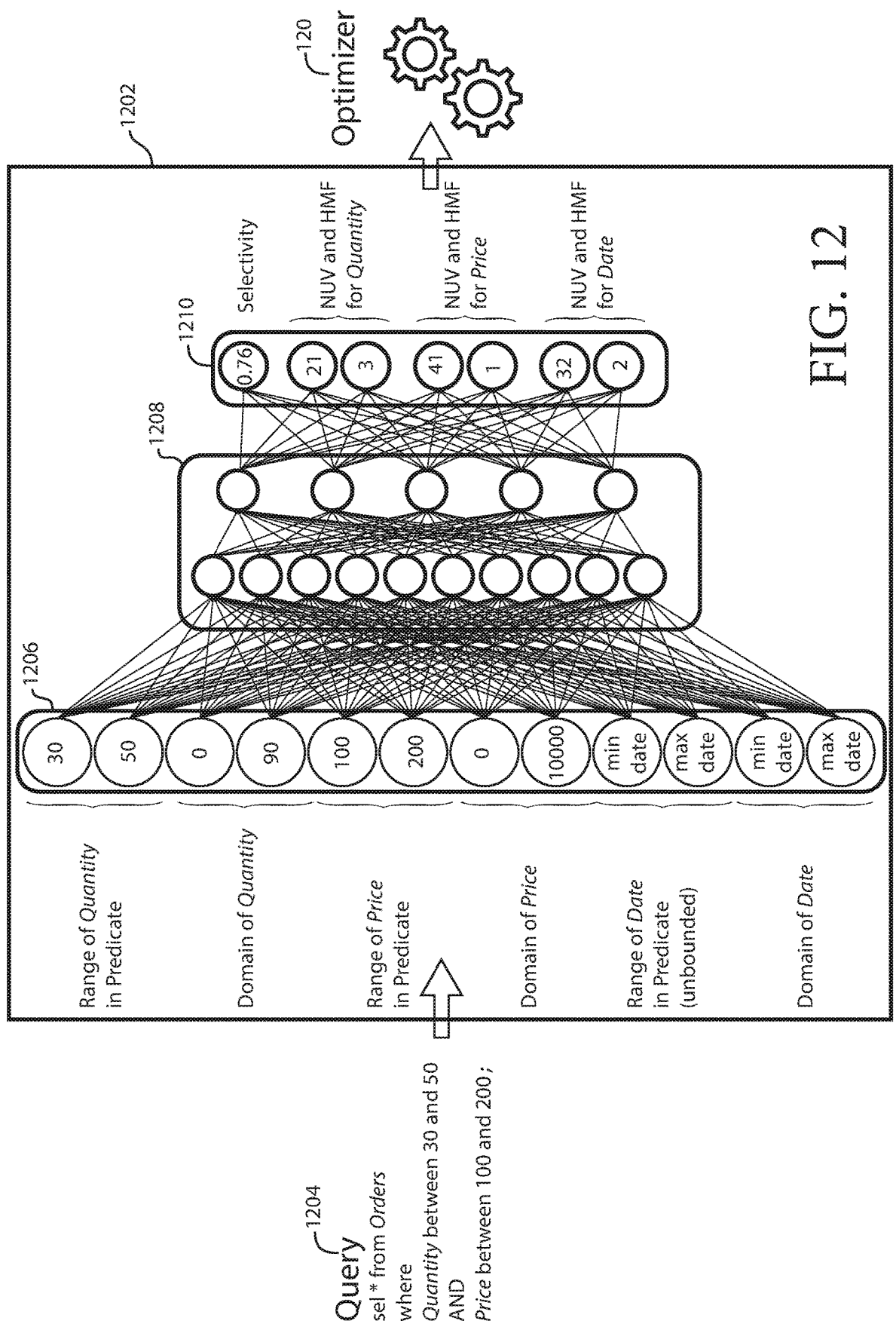
FIG. 12 is a block diagram of an example of the alternative neural network of FIG. 11.

FIG. 12 is a block diagram of an example of the alternative neural network of FIG. 11. In the neural network 1202 of FIG. 12, the input vector is derived from a query 1204:

sel*from Orders
where
Quantity between 30 and 50
AND
Price between 100 and 200;

In the example, the Orders table also has a Date column that is not part of the predicate of the query. The resulting input vector has entries for the range of the Quantity column in the predicate (low=30, high=50), the domain of the Quantity column (low=0, high=90), the range of the Price column in the predicate (low=100, high=200), the domain of the Price column (low=0, high=10000), the range of the Date column in the predicate (set to low=min date and high=max date because the predicate does not include the Date column), and the domain of the Date column (low=min date, high=max date). The neural network 1202 includes an input layer 1206 having 4 neurons for each column in the table, a hidden layer 1208, and an output layer 1210 having a neuron with a selectivity estimate, an NUV neuron for each of the columns in the table and an HMF neuron for each of the columns in the table. The optimizer 120 makes use of the data in the neurons in the output layer 1210 to select a join plan.

Further examples consistent with the present disclosure are set out in the following numbered clauses.

Clause 1 A method of estimating parameters of a result of applying a predicate to a single database table, the method comprising:
  receiving, with a processor, a database query to be run against a database,
    the query comprising a query predicate,
    the query predicate comprising a condition, the condition applying to a single database table;
  parsing the condition to create an input vector;
  submitting the input vector to a neural network, wherein
    the neural network is trained to calculate the selectivity, a number of unique values (NUV) of results of applying predicates to the single database table, and a high mode frequency (HMF) of results of applying predicates to the single database table;

determining, with the neural network, estimates of:
  the selectivity of the query predicate,
    an NUV for each column in the result of applying the query predicate to the single database table, and
    an HMF for each column in the result of applying the query predicate to the single database table.

Clause 2 The method of clause 1 wherein:
each input vector comprises a lower bound for a column of the single database table, the lower bound being determined from the query predicate, and an upper bound for the column of the single database table, the upper bound being determined from the query predicate.

Clause 3 The method of any preceding clause wherein:
the query predicate does not restrict one or both of the lower bound or the upper bound for the column and the unrestricted lower bound or the unrestricted upper bound in the input vector is set to a minimum value or a maximum value, respectively, of the column.

Clause 4 The method of any preceding clause wherein:
the neural network comprises:
  an input layer comprising a plurality of neurons, wherein each neuron receives one value from the input vector,
  one or more hidden layers coupled to the input layer, and
  an output layer coupled to the one or more hidden layers.

Clause 5 The method of any preceding clause further comprising:
  training the neural network by:
    creating a training dataset having:
      a plurality of training input vectors, and
      an actual selectivity for each of the plurality of training input vectors as applied to the single database table;
    creating a verification dataset by:
      generating a predicted selectivity for each of the plurality of training input vectors by submitting each of the plurality of training input vectors to the neural network;
    comparing the actual selectivities of the training dataset to the predicted selectivities of the verification dataset, and
    adjusting the neural network to reduce differences between the actual selectivities of the training dataset to the predicted selectivities of the verification dataset.

Clause 6 The method of clause 5 wherein:
the training input vectors are derived from previously-run queries, and
the actual selectivities are derived from one or more of execution logs and execution of the previously-run queries.

Clause 7 The method of clauses 5 or 6 wherein:
the training input vectors are randomly generated; and
the actual selectivities are derived from execution of queries with predicates converted from the randomly-generated training input vectors.

Clause 8 A computer program, stored in a non-transitory computer-readable tangible medium, on which is recorded a computer program, the computer program comprising executable instructions, that, when executed, perform a method of estimating parameters of a result of applying a predicate to a single database table comprising:
  receiving, with a processor, a database query to be run against a database,
  the query comprising a query predicate,
  the query predicate comprising a condition, the condition applying to a single database table;
  parsing the condition to create an input vector;
  submitting the input vector to a neural network, wherein the neural network is trained to determine the selectivity, a number of unique values (NUV) of results of applying of predicates to the single database table, and a high mode frequency (HMF) of results of applying predicates to the single database table;
  determining, with the neural network, estimates of:
    the selectivity of the query predicate,
      an NUV for each column in a result of applying the query predicate to the single database table, and
      an HMF for each column in the result of applying the query predicate to the single database table.

Clause 9 The computer program of clause 8 wherein:
each input vector comprises a lower bound for a column of the single database table, the lower bound being determined from the query predicate, and an upper bound for the column of the single database table, the upper bound being determined from the query predicate.

Clause 10 The computer program of clauses 8 or 9 wherein:
the query predicate does not restrict one or both of the lower bound or the upper bound for the column and the unrestricted lower bound or the unrestricted upper bound in the input vector is set to a minimum value or a maximum value, respectively, of the column.

Clause 11 The computer program of any clauses 8, 9, or 10 wherein:
the neural network comprises:
  an input layer comprising a plurality of neurons, wherein each neuron receives one value from the input vector,
  one or more hidden layers coupled to the input layer, and
  an output layer coupled to the one or more hidden layers.

Clause 12 The computer program of clauses 8, 9, 10, or 11, wherein the method further comprises:
  training the neural network by:
    creating a training dataset having:
      a plurality of training input vectors, and an actual selectivity for each of the plurality of training input vectors as applied to the single database table;
    creating a verification dataset by:
      generating a predicted selectivity for each of the plurality of training input vectors by submitting each of the plurality of training input vectors to the neural network;
    comparing the actual selectivities of the training dataset to the predicted selectivities of the verification dataset, and
    adjusting the neural network to reduce differences between the actual selectivities of the training dataset to the predicted selectivities of the verification dataset.

Clause 13 The computer program of clause 12 wherein:
the training input vectors are derived from previously-run queries, and
the actual selectivities are derived from one or more of execution logs and execution of the previously-run queries.

Clause 14 The computer program of clauses 12 or 13 wherein:
   the training input vectors are randomly generated; and
   the actual selectivities are derived from execution of queries with predicates converted from the randomly-generated training input vectors.

Clause 15 A system of estimating parameters of a result of applying a predicate that refers only to a single database table, the system comprising:
   a predicate parser to parse the predicate into an input vector;
   a neural network to receive the input vector from the predicate parser and to produce an estimate of a selectivity, a number of unique values (NUV) in each column of the result of applying the predicate to the single database table, and a high mode frequency (HMF) in each column of the result of applying the input vector to the single database table, wherein the neural network has been trained to determine estimates of a selectivity, a number of unique values (NUV) in each column of the results of applying predicates to the single database table, and a high mode frequency (HMF) in each column of the results of applying predicates to the single database table; and
   an optimizer in a database system to use the selectivity from the neural network and to use the selectivity, the NUV for each column, and the HMF for each column in planning execution of a query that includes the predicate.

Clause 16 The system of clause 15 wherein the predicate comprises one or more conditions and the input vector comprises a lower bound entry and an upper bound entry for each condition in the predicate.

Clause 17 The system of clauses 15 or 16 wherein the neural network comprises an input layer having a neuron for each entry in the input vector.

Clause 18 The system of clauses 15, 16, or 17 wherein the neural network comprises:
   an input layer having a neuron for each entry in the input vector, each neuron to receive an input from a corresponding input in the input vector;
   one or more hidden layers coupled to the input layer; and
   an output layer coupled to the one or more hidden layers.

Clause 19 The system of clause 18 wherein the output layer consists of 2n+1 neurons, where n is the number of columns in the single database table.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of estimating parameters of a result of applying a predicate to a single database table, the method comprising:
   receiving, with a processor, a database query to be run against a database,
      the query comprising a query predicate,
      the query predicate comprising a condition, the condition applying to a single database table;
   parsing the condition to create an input vector;
   submitting the input vector to a neural network, wherein the neural network is trained to determine the selectivity, a number of unique values (NUV) of results of applying of predicates to the single database table, and a high mode frequency (HMF) of results of applying of predicates to the single database table;
   determining, with the neural network, estimates of:
      the selectivity of the query predicate,
      an NUV for each column in a result of applying the query predicate to the single database table, and
      an HMF for each column in the result of applying the query predicate to the single database table;
   wherein each input vector comprises a lower bound for a column of the single database table, the lower bound being determined from the query predicate, and an upper bound for the column of the single database table, the upper bound being determined from the query predicate; and
   wherein the query predicate does not restrict one or both of the lower bound or the upper bound for the column and the unrestricted lower bound or the unrestricted upper bound in the input vector is set to a minimum value or a maximum value, respectively, of the column.

2. The method of claim 1 wherein:
the neural network comprises:
   an input layer comprising a plurality of neurons, wherein each neuron receives one value from the input vector,
   one or more hidden layers coupled to the input layer, and
   an output layer coupled to the one or more hidden layers.

3. The method of claim 1 further comprising:
training the neural network by:
   creating a training dataset having:
      a plurality of training input vectors, and
      an actual selectivity for each of the plurality of training input vectors as applied to the single database table;
   creating a verification dataset by:
      generating a predicted selectivity for each of the plurality of training input vectors by submitting each of the plurality of training input vectors to the neural network;
   comparing the actual selectivities of the training dataset to the predicted selectivities of the verification dataset, and
   adjusting the neural network to reduce differences between the actual selectivities of the training dataset to the predicted selectivities of the verification dataset.

4. The method of claim 3 wherein:
the training input vectors are derived from previously-run queries, and the actual selectivities are derived from one or more of execution logs and execution of the previously-run queries.

5. The method of claim 3 wherein:
the training input vectors are randomly generated; and
the actual selectivities are derived from execution of queries with predicates converted from the randomly-generated training input vectors.

6. A computer program, stored in a non-transitory computer-readable tangible medium, on which is recorded a computer program, the computer program comprising executable instructions, that, when executed, perform a method of estimating parameters of a result of applying a predicate to a single database table comprising:
receiving, with a processor, a database query to be run against a database,
the query comprising a query predicate,
the query predicate comprising a condition, the condition applying to a single database table;
parsing the condition to create an input vector;
submitting the input vector to a neural network, wherein the neural network is trained to determine the selectivity, a number of unique values (NUV) of results of applying of predicates to the single database table, and a high mode frequency (HMF) of results of applying predicates to the single database table;
determining, with the neural network estimates of:
the selectivity of the query predicate,
an NUV for each column in a result of applying the query predicate to the single database table, and
an HMF for each column in the result of applying the query predicate to the single database table;
training the neural network by:
creating a training dataset having:
a plurality of training input vectors, and
an actual selectivity for each of the plurality of training input vectors as applied to the single database table;
creating a verification dataset by:
generating a predicted selectivity for each of the plurality of training input vectors by submitting each of the plurality of training input vectors to the neural network;
comparing the actual selectivities of the training dataset to the predicted selectivities of the verification dataset, and
adjusting the neural network to reduce differences between the actual selectivities of the training dataset to the predicted selectivities of the verification dataset.

7. The computer program of claim 6 wherein:
each input vector comprises a lower bound for a column of the single database table, the lower bound being determined from the query predicate, and an upper bound for the column of the single database table, the upper bound being determined from the query predicate.

8. The computer program of claim 7 wherein:
the query predicate does not restrict one or both of the lower bound or the upper bound for the column and the unrestricted lower bound or the unrestricted upper bound in the input vector is set to a minimum value or a maximum value, respectively, of the column.

9. The computer program of claim 6 wherein:
the neural network comprises:
an input layer comprising a plurality of neurons, wherein each neuron receives one value from the input vector,
one or more hidden layers coupled to the input layer, and
an output layer coupled to the one or more hidden layers.

10. The computer program of claim 6 wherein:
the training input vectors are derived from previously-run queries, and
the actual selectivities are derived from one or more of execution logs and execution of the previously-run queries.

11. The computer program of claim 6 wherein:
the training input vectors are randomly generated; and
the actual selectivities are derived from execution of queries with predicates converted from the randomly-generated training input vectors.

12. A system of estimating parameters of a result of applying a predicate that refers only to a single database table, the system comprising:
a predicate parser to parse the predicate into an input vector;
a neural network to receive the input vector from the predicate parser and to produce an estimate of a selectivity, a number of unique values (NUV) in each column of the result of applying the predicate to the single database table, and a high mode frequency (HMF) in each column of the result of applying the input vector to the single database table, wherein the neural network has been trained to determine estimates of the selectivity, a number of unique values (NUV) in each column of the results of applying predicates to the single database table, and a high mode frequency (HMF) in each column of the results of applying predicates to the single database table; and
an optimizer in a database system to use the selectivity, the NUV for each column, and the HMF for each column in planning execution of a query that includes the predicate;
wherein the predicate comprises one or more conditions and the input vector comprises a lower bound entry and an upper bound entry for each condition in the predicate;
wherein the neural network comprises:
an input layer having a neuron for each entry in the input vector, each neuron to receive an input from a corresponding input in the input vector,
one or more hidden layers coupled to the input layer, and
an output layer coupled to the one or more hidden layers; and
wherein the output layer consists of 2n+1 neurons, where n is the number of columns in the single database table.

13. The system of claim 12 wherein the neural network comprises an input layer having a neuron for each entry in the input vector.

* * * * *